US011431676B2

(12) United States Patent
Gan

(10) Patent No.: US 11,431,676 B2
(45) **Date of Patent: *Aug. 30, 2022**

(54) METHOD, APPARATUS, AND SYSTEM FOR DETECTING TERMINAL SECURITY STATUS

(71) Applicant: Huawei Technologies Co., Ltd., Shenzhen (CN)

(72) Inventor: Yongcun Gan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

This patent is subject to a terminal disclaimer.

(21) Appl. No.: 16/897,050

(22) Filed: Jun. 9, 2020

(65) Prior Publication Data

US 2020/0304463 A1 Sep. 24, 2020

Related U.S. Application Data

(63) Continuation of application No. 15/871,308, filed on Jan. 15, 2018, now Pat. No. 10,735,374, which is a (Continued)

(30) Foreign Application Priority Data

Dec. 24, 2015 (CN) ......................... 201510988051.4

(51) Int. Cl.

*H04L 9/40* (2022.01)
*G06F 21/55* (2013.01)
*G06F 21/56* (2013.01)

(52) U.S. Cl.

CPC ........ *H04L 63/0209* (2013.01); *G06F 21/552* (2013.01); *G06F 21/56* (2013.01);
(Continued)

(58) Field of Classification Search

CPC ... H04L 63/0209; H04L 29/06; H04L 63/145; H04L 63/1416; H04L 63/1433;
(Continued)

(56) References Cited

U.S. PATENT DOCUMENTS

| | | | | |
|---|---|---|---|---|
| 7,096,501 | B2 * | 8/2006 | Kouznetsov | H04L 69/329 713/191 |
| 8,276,202 | B1 | 9/2012 | Dubrovsky et al. | |

(Continued)

FOREIGN PATENT DOCUMENTS

| | | | |
|---|---|---|---|
| CN | 1737722 | A | 2/2006 |
| CN | 1760883 | A | 4/2006 |

(Continued)

*Primary Examiner* — Aravind K Moorthy
(74) *Attorney, Agent, or Firm* — Slater Matsil, LLP

(57) ABSTRACT

A method, an apparatus, and a system for detecting a terminal security status are provided. The method includes: receiving a file, and running the file, to generate a dynamic behavior result. The dynamic behavior result includes a behavior sequence that is generated according to a chronological order of occurrence of behaviors. When the file includes an APT, the security protection device obtains a stable behavior feature in the dynamic behavior result, generates a corresponding IOC according to the stable behavior feature, and sends the generated IOC to a terminal. The stable behavior feature is a behavior always existing in a behavior sequence that is generated each time after the file is run.

18 Claims, 8 Drawing Sheets

Related U.S. Application Data continuation of application No. PCT/CN2016/101263, filed on Sep. 30, 2016.

(52) U.S. Cl.
CPC .............. *H04L 9/40* (2022.05); *H04L 63/145* (2013.01); *G06F 2221/2101* (2013.01)

(58) Field of Classification Search
CPC ......... H04L 9/40; G06F 21/552; G06F 21/56; G06F 2221/2101
See application file for complete search history.

(56) References Cited

U.S. PATENT DOCUMENTS

| | | | | |
|---|---|---|---|---|
| 8,904,531 | B1 * | 12/2014 | Saklikar | H04L 63/1416 726/25 |
| 9,065,849 | B1 * | 6/2015 | Rivera | H04L 63/145 |
| 9,092,625 | B1 * | 7/2015 | Kashyap | G06F 21/52 |
| 9,165,142 | B1 | 10/2015 | Sanders et al. | |
| 9,294,486 | B1 | 3/2016 | Chiang et al. | |
| 9,332,022 | B1 * | 5/2016 | Ashley | H04L 63/1441 |
| 9,338,175 | B1 | 5/2016 | Ramos et al. | |
| 9,355,246 | B1 * | 5/2016 | Wan | G06F 21/566 |
| 9,378,361 | B1 * | 6/2016 | Yen | G06F 21/552 |
| 9,390,268 | B1 * | 7/2016 | Martini | H04L 63/1433 |
| 9,596,266 | B1 * | 3/2017 | Coleman | G06F 21/53 |
| 9,665,715 | B1 * | 5/2017 | Roundy | G06F 21/561 |
| 9,690,931 | B1 * | 6/2017 | Anantharaju | G06F 21/6227 |
| 9,742,796 | B1 * | 8/2017 | Salsamendi | G06F 21/568 |
| 9,747,446 | B1 * | 8/2017 | Pidathala | G06F 21/56 |
| 9,811,659 | B1 * | 11/2017 | Asheghian | H04L 63/1416 |
| 9,825,989 | B1 * | 11/2017 | Mehra | H04L 63/145 |
| 9,832,227 | B2 * | 11/2017 | Bhargava | H04L 63/20 |
| 9,860,208 | B1 * | 1/2018 | Ettema | H04L 63/0227 |
| 9,882,929 | B1 * | 1/2018 | Ettema | H04L 63/145 |
| 9,961,093 | B1 * | 5/2018 | Wittenstein | H04L 63/145 |
| 10,447,710 | B1 * | 10/2019 | Li | H04L 63/0876 |
| 10,515,214 | B1 * | 12/2019 | Vincent | G06F 21/562 |
| 2003/0233574 | A1 * | 12/2003 | Kouznetsov | G06F 21/564 726/30 |
| 2005/0273858 | A1 * | 12/2005 | Zadok | H04L 67/06 709/230 |
| 2006/0259967 | A1 | 11/2006 | Thomas et al. | |
| 2008/0016339 | A1 | 1/2008 | Shukla | |
| 2010/0077476 | A1 | 3/2010 | Adams | |
| 2012/0079596 | A1 | 3/2012 | Thomas et al. | |
| 2012/0167164 | A1 * | 6/2012 | Burgess | G06F 21/552 726/28 |
| 2012/0311713 | A1 * | 12/2012 | Amit | H04L 63/1466 726/25 |
| 2013/0145463 | A1 | 6/2013 | Ghosh et al. | |
| 2013/0276122 | A1 * | 10/2013 | Sowder | H04L 7/00 726/24 |
| 2014/0075536 | A1 | 3/2014 | Davis et al. | |
| 2014/0373087 | A1 * | 12/2014 | Ciu | H04L 63/145 726/1 |
| 2015/0096024 | A1 * | 4/2015 | Haq | H04L 63/1416 726/23 |
| 2015/0128274 | A1 * | 5/2015 | Giokas | H04L 51/12 726/23 |
| 2015/0150129 | A1 * | 5/2015 | Giura | H04L 63/145 726/23 |
| 2015/0227742 | A1 | 8/2015 | Pereira | |
| 2015/0244732 | A1 * | 8/2015 | Golshan | H04L 63/145 726/24 |
| 2015/0310196 | A1 * | 10/2015 | Turgeman | G01R 29/26 726/19 |
| 2015/0312266 | A1 * | 10/2015 | Thomas | H04L 65/1033 726/24 |
| 2015/0312268 | A1 * | 10/2015 | Ray | H04L 63/1416 726/23 |
| 2016/0057166 | A1 * | 2/2016 | Chesla | H04L 63/14 726/22 |
| 2016/0065594 | A1 * | 3/2016 | Srivastava | H04L 63/1433 726/23 |
| 2016/0072838 | A1 * | 3/2016 | Kolton | H04L 63/145 726/23 |
| 2016/0078236 | A1 * | 3/2016 | Chesla | H04L 63/1441 726/1 |
| 2016/0078365 | A1 | 3/2016 | Baumard | |
| 2016/0092682 | A1 | 3/2016 | Adams et al. | |
| 2016/0117498 | A1 * | 4/2016 | Saxena | G06F 21/755 726/26 |
| 2016/0127395 | A1 * | 5/2016 | Underwood | G06F 21/556 726/23 |
| 2016/0226905 | A1 * | 8/2016 | Baikalov | H04L 63/1433 |
| 2016/0261628 | A1 * | 9/2016 | Doron | H04L 63/1458 |
| 2016/0269424 | A1 * | 9/2016 | Chandola | H04L 63/1416 |
| 2016/0277423 | A1 | 9/2016 | Apostolescu et al. | |
| 2016/0330218 | A1 * | 11/2016 | Hussey | H04L 63/1441 |
| 2016/0336844 | A1 | 11/2016 | Ikegawa et al. | |
| 2016/0381049 | A1 * | 12/2016 | Lakhani | H04L 63/1416 726/23 |
| 2016/0381070 | A1 * | 12/2016 | Zhang | H04L 63/145 726/23 |
| 2017/0093890 | A1 * | 3/2017 | Natanzon | G06F 11/1458 |
| 2017/0099306 | A1 * | 4/2017 | Chiu | H04L 63/1425 |
| 2017/0124321 | A1 | 5/2017 | Qian et al. | |
| 2017/0142144 | A1 * | 5/2017 | Weinberger | H04L 63/1408 |
| 2019/0215301 | A1 * | 7/2019 | Abdulhayoglu | H04L 63/1425 |

FOREIGN PATENT DOCUMENTS

| | | | |
|---|---|---|---|
| CN | 101034974 | A | 9/2007 |
| CN | 101572691 | A | 11/2009 |
| CN | 102457495 | A | 5/2012 |
| CN | 102930210 | A | 2/2013 |
| CN | 102970309 | A | 3/2013 |
| CN | 103051627 | A | 4/2013 |
| CN | 103312679 | A | 9/2013 |
| CN | 103354548 | A | 10/2013 |
| CN | 103634264 | A | 3/2014 |
| CN | 103905418 | A | 7/2014 |
| CN | 103916365 | A | 7/2014 |
| CN | 104506495 | A | 4/2015 |
| CN | 104657915 | A | 5/2015 |
| CN | 104850780 | A | 8/2015 |
| WO | 2015127475 | A1 | 8/2015 |

* cited by examiner

A dynamic behavior result including a typical APT threat

```
/* A sample releases a PE file: C:\WINDOWS\apocalyps32.exe */
<record id="314"><pname>1077.exe</pname><pid>1448</pid><action
arg1="C:\WINDOWS\apocalyps32.exe" arg2="32">FCreate</action></record>
<record id="316"><pname>1077.exe</pname><pid>1448</pid><action
arg1="C:\windows\apocalyps32.exe" arg2="Offset: 0 Length:
65536">FWritePE</action></record>
<record id="317"><pname>1077.exe</pname><pid>1448</pid><action
arg1="C:\WINDOWS\apocalyps32.exe" arg2="Offset: 65536 Length: 43008"
arg3="SUCCESS">FAST_FWRITE</action></record>

/* Run the sample: C:\WINDOWS\apocalyps32.exe */
<record id="370"><pname>1077.exe</pname><pid>1448</pid><action
arg1="C:\WINDOWS\apocalyps32.exe:1252">CreateProcess</action></record>
<record id="371"><pname>1077.exe</pname><pid>1448</pid><action
arg1="C:\WINDOWS\apocalyps32.exe.Manifest">FOpen</action></record>
<record id="372"><pname>1077.exe</pname><pid>1448</pid><action
arg1="None">KillSelf</action></record>

/* Create a thread, and inject the thread into the process IEXPLORE.EXE to hide the
thread */
<record id="1780"><pname>IEXPLORE.EXE</pname><pid>1244</pid><action
arg1="explorer.exe">OpenProcesss</action></record>
<record id="1781"><pname>IEXPLORE.EXE</pname><pid>1244</pid><action
arg1="explorer.exe:2016">WriteOtherProcMem</action></record>
<record id="1782"><pname>IEXPLORE.EXE</pname><pid>1244</pid><action
arg1="explorer.exe:2016">WriteOtherProcMem</action></record>
<record id="1783"><pname>IEXPLORE.EXE</pname><pid>1244</pid><action
arg1="explorer.exe:2016">WriteOtherProcMem</action></record>
<record id="1784"><pname>IEXPLORE.EXE</pname><pid>1244</pid><action
arg1="explorer.exe:2016">WriteOtherProcMem</action></record>
<record id="1785"><pname>IEXPLORE.EXE</pname><pid>1244</pid><action
arg1="explorer.exe:2016">WriteOtherProcMem</action></record>
<record id="1786"><pname>IEXPLORE.EXE</pname><pid>1244</pid><action
arg1="explorer.exe:2016">WriteOtherProcMem</action></record>
<record id="1787"><pname>IEXPLORE.EXE</pname><pid>1244</pid><action
arg1="explorer.exe:2016">CreateRemoteThread</action></record>

/* Modify a registry to add a startup item */
<record id="1788"><pname>IEXPLORE.EXE</pname><pid>1244</pid><action
arg1="HKLM\SOFTWARE\Microsoft\Windows\CurrentVersion\Run"
arg2="Open">RegCreateKey</action></record>
<record id="1789"><pname>IEXPLORE.EXE</pname><pid>1244</pid><action
arg1="HKLM\SOFTWARE\Microsoft\Windows\CurrentVersion\Run\apocalyps32"
arg2="C:\WINDOWS\apocalyps32.exe">RegSetValue</action></record>
/* Connect to an external network: 5.5.66.101:1453 */
<record id="1850"><pname>iexplore.exe</pname><pid>1244</pid><action
arg1="340" arg2="5.5.66.101:1453">Connect</action></record>
```

FIG. 3

File-type IOC

```
<Indicator operator="AND" id="4c032204-5441-4c32-accc-d8777bd3cf53">
      <IndicatorItem id="0df0bdb5-8c53-47e2-9242-96830aeb1508"
condition="contains">
        <Context document="FileItem" search="FileItem/FullPath" type="mir" />
        <Content type="string">C:\WINDOWS\apocalyps32.exe</Content>
      </IndicatorItem>
      <IndicatorItem id="bd99c707-a7bf-4968-bed0-cc50d472b794" condition="is">
        <Context document="FileItem" search="FileItem/SizeInBytes" type="mir" />
        <Content type="int">108544</Content>
      </IndicatorItem>
    </Indicator>
```

FIG. 9

Registry-type IOC

```
<Indicator operator="AND" id="98f5e9ce-b591-43f0-95d3-36a4d3331ea5">
      <IndicatorItem id="43f047d6-1a9f-4a67-a524-a57d1e0231d3" condition="contains">
        <Context document="RegistryItem" search="RegistryItem/Path" type="mir" />
        <Content
type="string">HKLM\SOFTWARE\Microsoft\Windows\CurrentVersion\Run\apocalyps32
</Content>
      </IndicatorItem>
      <IndicatorItem id="48e07653-2008-4cac-8abe-defb250a47da" condition="contains">
        <Context document="RegistryItem" search="RegistryItem/Value" type="mir" />
        <Content type="string">C:\WINDOWS\apocalyps32.exe</Content>
      </IndicatorItem>
    </Indicator>
```

FIG. 10

Summarized IOC

```
<?xml version="1.0" encoding="us-ascii"?>
<ioc xmlns:xsi="http://www.w3.org/2001/XMLSchema-instance" xmlns:xsd="http://
www.w3.org/2001/XMLSchema" id="d98cb116-b096-4c7f-be0e-2007ed5970b1" last-
modified="2015-09-14T08:46:45" xmlns="http://schemas.mandiant.com/2010/ioc">
 <short_description>7c948a01de2fecd94a18df9cce2af6b2</short_description>
 <authored_by>William Gan</authored_by>
 <authored_date>2015-09-14T08:38:29</authored_date>
 <links />
<definition>
<Indicator operator="OR" id="b9199f67-2b9b-4377-ad90-b1f3e316d487">
   <Indicator operator="AND" id="4c032204-5441-4c32-accc-d8777bd3cf53">
    <IndicatorItem id="0df0bdb5-8c53-47e2-9242-96830aeb1508"
condition="contains">
     <Context document="FileItem" search="FileItem/FullPath" type="mir" />
     <Content type="string">C:\WINDOWS\apocalyps32.exe</Content>
    </IndicatorItem>    <IndicatorItem id="bd99c707-a7bf-4968-bed0-cc50d472b794"
condition="is">
     <Context document="FileItem" search="FileItem/SizeInBytes" type="mir" />
     <Content type="int">108544</Content>     </IndicatorItem>    </Indicator>
   <Indicator operator="AND" id="98f5e9ce-b591-43f0-95d3-36a4d3331ea5">
    <IndicatorItem id="43f047d6-1a9f-4a67-a524-a57d1e0231d3" condition="contains">
     <Context document="RegistryItem" search="RegistryItem/Path" type="mir" />
     <Content type="string">HKLM\SOFTWARE\Microsoft\Windows\
CurrentVersion\Run\apocalyps32</Content>
    </IndicatorItem>    <IndicatorItem id="48e07653-2008-4cac-8abe-defb250a47da"
condition="contains">    <Context document="RegistryItem" search="RegistryItem/
Value" type="mir" />
     <Content type="string">C:\WINDOWS\apocalyps32.exe</Content>
    </IndicatorItem>    </Indicator>
</Indicator>  </definition> </ioc>
```

FIG. 11

METHOD, APPARATUS, AND SYSTEM FOR DETECTING TERMINAL SECURITY STATUS

CROSS-REFERENCE TO RELATED APPLICATIONS

This application is a continuation of U.S. patent application Ser. No. 15/871,308, filed on Jan. 15, 2018, which is a continuation of International Application No. PCT/CN2016/101263, filed on Sep. 30, 2016, which claims priority to Chinese Patent Application No. 201510988051.4, filed on Dec. 24, 2015. The disclosures of the aforementioned applications are hereby incorporated by reference in their entireties.

TECHNICAL FIELD

This application relates to the field of computers, and in particular, to the field of computer security protection.

BACKGROUND

As a next generation threat represented by an advanced persistent threat (APT) arises, a conventional security protection approach faces challenges. Once attacked by the APT, a core trade secret of a company may be leaked, resulting in incalculable losses for the company. Industries related to national economies and people's livelihoods, such as the financial industry, the energy industry, and the transportation industry, may be paralyzed. The effect thereof can be as severe as an effect of a war.

In 2010, Google (Google Incorporation) was attacked by a next generation threat of Aurora. As a result, a large quantity of Gmail (a free network email service of Google) emails was leaked, severely affecting the Google brand. In 2010, nuclear facilities of Iran were attacked by Stuxnet, causing a severe damage to a centrifuge, which is a core component of the nuclear facilities. A consequence of this attack can be as severe as a precision bombing. In 2011, RSA was attacked by a next generation threat for SecureID. Consequently, a large quantity of SecureID data was leaked, and security of customers using SecureID was severely affected. Doubts about security of RSA severely affected the public image of RSA. In March 2013, the banking industry of the Republic of Korea was attacked by an orientated APT. Consequently, many bank host systems broke down, severely affecting the image of banks in customers' mind. How to cope with the next generation threat represented by the APT in the future and how to cope with a future possible network war are significant problems faced by people.

In an existing user network, anti-virus software is usually installed on a terminal device, and a sandbox is deployed in front of a gateway or in front of an email server. The anti-virus software installed on the terminal device detects malicious software mainly using a latest feature library provided by a software vendor. The sandbox is deployed in front of the gateway or the email server, mainly to detect an APT from the Internet.

Sandboxes are generally capable of detecting the APT from the Internet. However, while sandboxes may be able to monitor that an internal network is being attacked by the APT, sandboxes may not be able to detect whether a user terminal on the internal network is infected with the APT, and may not be able to identify user terminals of the internal network that are infected with the APT. For example, a sandbox may detect that an internal network to which the sandbox belongs is being attacked by an APT, and the APT attack was sent to user terminals by using an email. Some user terminals are infected with the APT because they have opened the email including an APT attachment, and some user terminals are not infected with the APT because they have not opened the email. For another example, a sandbox detects that an internal network to which the sandbox belongs is being attacked by an APT, and the APT attack is implemented using a vulnerability of a particular version of application software. Some user terminals use this version of the application software, and therefore are being attacked by the APT. Some user terminals use a later version, which has no corresponding vulnerability, of the application software, and therefore the user terminals are not being attacked by the APT.

As such, although an attack by the APT on an internal network can be detected using an existing sandbox, whether a user terminal is infected with the APT, and identifying specific user terminals infected with the APT, cannot be determined. Therefore, no targeted operation can be used.

SUMMARY

A method, an apparatus, and a system for detecting a terminal security status are described in this specification, to detect whether a specific terminal is infected with an APT.

According to a first aspect, an embodiment of this application provides an apparatus for detecting a terminal security status. The apparatus is located at a junction between a private network and a public network, and a terminal is located in the private network. The apparatus includes a dynamic behavior result generation module, a dynamic behavior analysis module, and an indicator of compromise generator.

The dynamic behavior result generation module is configured to: receive a file from the public network, and run the file in the apparatus, to generate a dynamic behavior result. The dynamic behavior result includes a behavior sequence that is generated according to a chronological order of occurrence of behaviors. Behaviors in the behavior sequence belong to different behavior types, and the behavior types include creating a file, modifying a registry, configuring a domain name, resolving an address, connecting to a network, loading a process, and adding a user. The dynamic behavior analysis module is configured to determine, according to the dynamic behavior result generated by the dynamic behavior result generation module, whether the file includes an advanced persistent threat. The indicator of compromise generator is configured to, if the dynamic behavior analysis module determines that the file includes the advanced persistent threat, obtain a stable behavior feature in the dynamic behavior result, generate a corresponding indicator of compromise according to the stable behavior feature, and send the indicator of compromise to the terminal. The stable behavior feature is a behavior always existing in a behavior sequence that is generated each time after the file is run.

According to a second aspect, an embodiment of this application provides a terminal device. The terminal includes a receiving module, an indicator of compromise interpreter, and a determining module.

The receiving module is configured to receive an indicator of compromise from a security protection device. The indicator of compromise interpreter is configured to parse the indicator of compromise received by the receiving module, to obtain a behavior feature that corresponds to an advanced persistent threat and that is included in the indicator of compromise. The determining module is configured to search an operating system and a file system of the terminal device, to determine whether a behavior described by the behavior feature corresponding to the advanced persistent threat has occurred in the terminal, and if the behavior described by the behavior feature corresponding to the advanced persistent threat has occurred in the terminal device, determine that the terminal device has been infected with the advanced persistent threat.

According to a third aspect, an embodiment of this application provides a system for detecting a terminal security status. The system includes the apparatus for detecting a terminal security status according to the first aspect, and the terminal device according to the second aspect.

According to a fourth aspect, an embodiment of this application provides a method for detecting a terminal security status. The method is executed by a security protection device, the security protection device is located at a junction between a private network and a public network, and a terminal is located in the private network.

First, the security protection device receives a file from the public network, and runs the file in the security protection device, to generate a dynamic behavior result. The dynamic behavior result includes a behavior sequence that is generated according to a chronological order of occurrence of behaviors. Behaviors in the behavior sequence belong to different behavior types, and the behavior types include creating a file, modifying a registry, configuring a domain name, resolving an address, connecting to a network, loading a process, and adding a user. The security protection device determines, according to the generated dynamic behavior result, whether the file includes an advanced persistent threat. If the file includes the advanced persistent threat, the security protection device obtains a stable behavior feature in the dynamic behavior result, generates a corresponding indicator of compromise according to the stable behavior feature, and sends the indicator of compromise to the terminal. The stable behavior feature is a behavior always existing in a behavior sequence that is generated each time after the file is run.

According to a fifth aspect, an embodiment of this application provides a method for detecting a terminal security status.

The terminal receives an indicator of compromise from a security protection device. The terminal parses the indicator of compromise, to obtain a behavior feature that corresponds to an advanced persistent threat and that is included in the indicator of compromise. The terminal also searches an operating system and a file system of the terminal, to determine whether behavior described by the behavior feature corresponding to the advanced persistent threat has occurred in the terminal. If the behavior described by the behavior feature corresponding to the advanced persistent threat has occurred in the terminal, the terminal determines that the terminal has been infected with the advanced persistent threat.

Compared with an existing sandbox, the solutions provided in the embodiments of this application can specifically detect whether there is a user terminal infected with the APT in a network, and can identify user terminals infected with the APT.

BRIEF DESCRIPTION OF THE DRAWINGS

To describe the technical solutions in the embodiments of this application more clearly, the following briefly describes the accompanying drawings required for describing the embodiments.

FIG. 3 is a schematic diagram of a dynamic behavior result;

FIG. 9 is a schematic diagram of a file-type IOC according to an embodiment of this application;

FIG. 10 is a schematic diagram of a registry-type IOC according to an embodiment of this application; and FIG. 11 is a schematic diagram of a summarized IOC according to an embodiment of this application.

DETAILED DESCRIPTION OF ILLUSTRATIVE EMBODIMENTS

The technical solutions in embodiments of this application are described in the following with reference to the accompanying drawings.

A network architecture is described in the embodiments of this application to describe the technical solutions in the embodiments of this application more clearly, and does not constitute any limitation to the technical solutions provided in the embodiments of this application. A person of ordinary skill in the art may learn that with evolution of network architectures and appearance of new service scenarios, the technical solutions provided in the embodiments of this application are also applicable to a similar technical problem.

Figure 1:
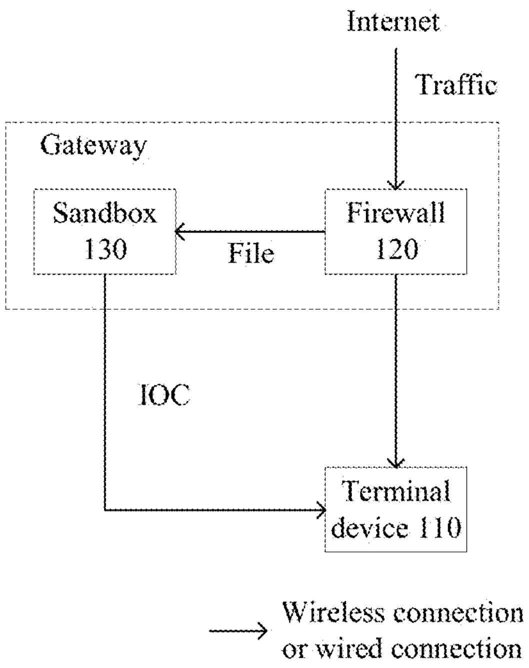
FIG. 1 is a schematic diagram of a network architecture for detecting that a terminal is infected with an APT according to an embodiment of this application.

FIG. 1 is a schematic diagram of a network architecture of a system for detecting a terminal security status according to an embodiment of this application. A terminal device no obtains data using the Internet. For example, the terminal device no receives an email. A firewall 120 arranged at a gateway receives packetized data, and combines the packetized data into a file to restore the transmitted file. For example, the firewall restores traffic to a file by using a Hypertext Transfer Protocol (HTTP) proxy method. Types of the file include an executable program (exe) file, a dynamic link library (DLL, also referred to as application program expansion) file, a system (sys) file, a com file, a doc file (a Word file), an Microsoft Excel worksheet (xls) file, a Portable Document Format (PDF) file, and the like. The firewall 120 sends a restored file to a sandbox 130 for detection. The sandbox 130 is arranged at the gateway, and detects whether the file from the firewall 120 is a malicious file including an advanced persistent threat (APT). If the sandbox 130 detects that the file includes the APT, the sandbox 130 generates an indicator of compromise (IOC) corresponding to the APT. The sandbox 130 synchronizes the IOC to each terminal device. Each terminal device parses the IOC, to obtain a behavior feature that is included in the IOC that corresponds to an APT. Each terminal device searches an operating system and a file system of the corresponding terminal device according to the behavior feature, to determine whether the user terminal is infected with the APT. The sandbox 130 is a security mechanism that provides an isolation environment for a running program. The sandbox 130 usually strictly controls a resource that can be accessed by a program running in the sandbox 130. For example, the sandbox 130 may provide disk and memory space that can be recycled after being used. In the sandbox 130, network access, access to a real operating system, and read and write permissions to an input device are prohibited or strictly restricted. A change made in the sandbox 130 does not cause any loss to the real operating system. Therefore, such a technology is usually widely applied to testing of an executable file carrying a virus, or other malicious code.

The user terminal in this application may include a terminal device such as a mobile phone, a tablet computer, a notebook computer, a ultra-mobile personal computer (UMPC), a netbook, or a personal digital assistant (PDA).

Figure 2:
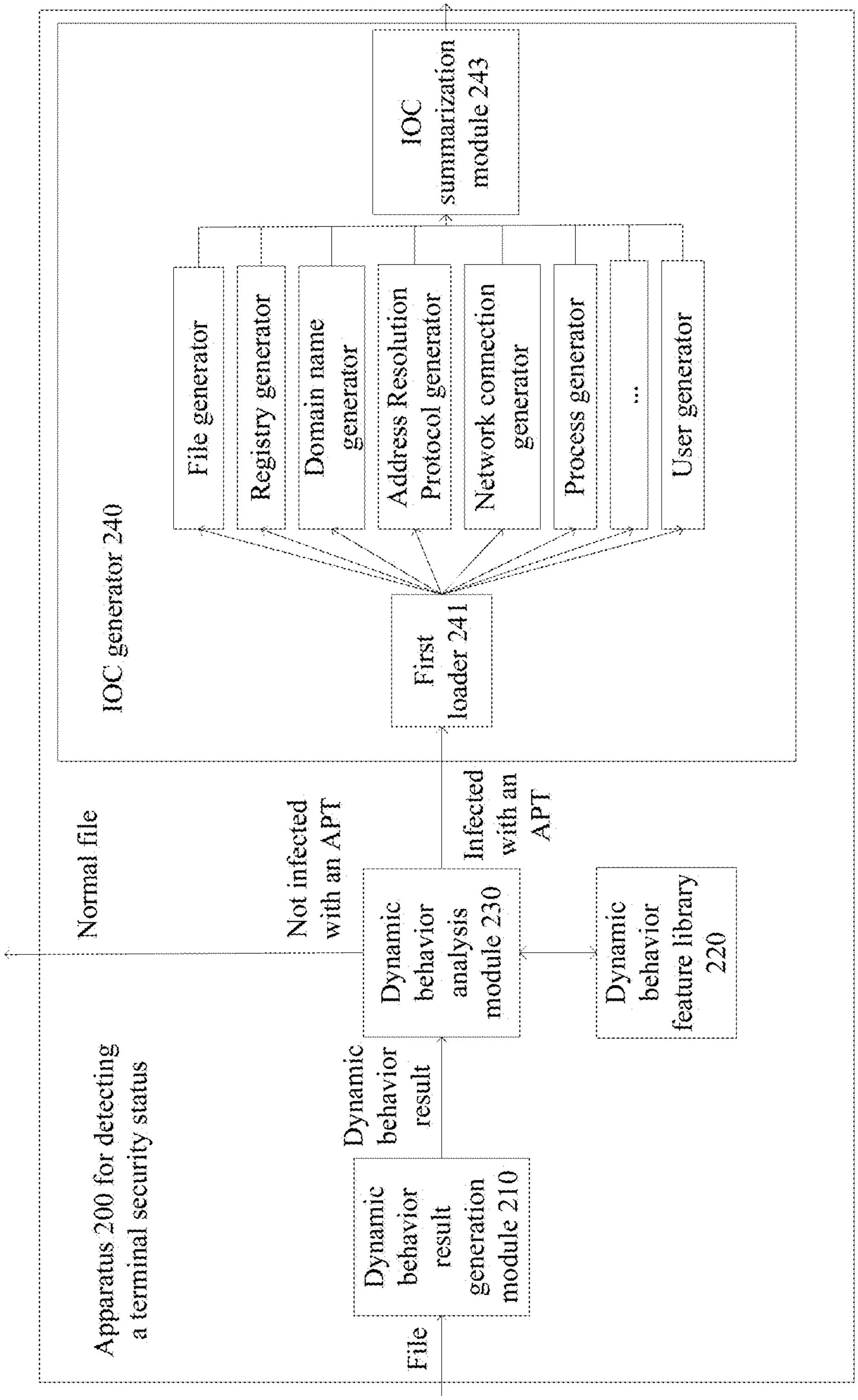
FIG. 2 is a block diagram of an apparatus for detecting a terminal security status according to an embodiment of this application.

FIG. 2 is a block diagram of an apparatus for detecting a terminal security status according to an embodiment of this application. The apparatus 200 for detecting a terminal security status, that is, a security protection apparatus, is located at a junction between a private network and a public network, and a terminal is located in the private network. The apparatus 200 includes: a dynamic behavior result generation module 210, a dynamic behavior analysis module 230, a dynamic behavior feature library 220, and an IOC generator 240.

In an example, the apparatus 200 for detecting a terminal security status is a sandbox. Further, the sandbox is arranged at a gateway.

The dynamic behavior result generation module 210 is configured to: receive a file from the public network, and run the file in the apparatus 200 for detecting a terminal security status, to generate a dynamic behavior result (referring to FIG. 3). The dynamic behavior result includes a behavior sequence that is generated according to a chronological order of occurrence of behaviors. Behaviors in the behavior sequence belong to different behavior types, and the behavior types include creating a file, modifying a registry, configuring a domain name, resolving an address, connecting to a network, loading a process, and adding a user.

The dynamic behavior analysis module 230 is configured to determine, according to the dynamic behavior result generated by the dynamic behavior result generation module 210, whether the file includes an APT.

The IOC generator 240 is configured to, if the dynamic behavior analysis module determines that the file includes the APT, obtain a stable behavior feature in the dynamic behavior result, generate a corresponding IOC according to the stable behavior feature, and send the IOC to the terminal. The stable behavior feature is a behavior always existing in a behavior sequence that is generated each time after the file is run.

In an example, a file from the public network is, for example, an exe file, a DLL file, a sys file, a com file, a doc file, an xls file, or a PDF file.

In an example, the dynamic behavior result includes a series of behavior operations. Each behavior operation includes a time-based behavior sequence.

In an example, the dynamic behavior result generation module 210 includes a heuristic detection engine module and a virtual execution environment module (which are not shown in FIG. 2) in an existing sandbox. The heuristic detection engine module includes a web heuristic detection engine submodule, a PDF heuristic detection engine submodule, and a Portable Executable (PE) heuristic detection engine submodule (which are not shown in FIG. 2). The heuristic detection engine module and the virtual execution environment module in the sandbox are all configured to generate a corresponding dynamic behavior result.

As shown in FIG. 3, FIG. 3 is a schematic diagram of a dynamic behavior result. The dynamic behavior result in FIG. 3 includes a behavior sequence that is generated according to a chronological order of occurrence of behaviors. Behaviors in the behavior sequence belong to different behavior types. In FIG. 3, the behavior types include creating a file, loading a process, modifying a registry, and connecting to a network.

In FIG. 2, the dynamic behavior feature library 220 includes multiple dynamic behavior features related to an APT. For example, the dynamic behavior feature library 220 includes a false positive behavior feature library and a threat behavior feature library (which are not shown in FIG. 2). The false positive behavior feature library includes multiple false positive behavior features. The threat behavior feature library includes multiple threat behavior features.

In an example, the dynamic behavior analysis module 230 matches the dynamic behavior result from the dynamic behavior result generation module 210 with each dynamic behavior feature in the dynamic behavior feature library 220, to determine whether the dynamic behavior result includes the APT.

In an example, the dynamic behavior analysis module 230 matches the dynamic behavior result first with each false positive behavior feature in the false positive behavior feature library of the dynamic behavior feature library 220, and then with each threat behavior feature in the threat behavior feature library, to determine whether the dynamic behavior result includes the APT.

In an example, after determining that the dynamic behavior result includes the APT, the dynamic behavior analysis module 230 sends the dynamic behavior result to an IOC generator 240. After determining that the dynamic behavior result does not include the APT, the dynamic behavior analysis module 230 sends the file (that is, a normal file, or an uninfected file) received by the apparatus 200 to a terminal device. That is, the dynamic behavior result received by the IOC generator 240 includes the APT.

The APT may be highly concealed, and an attack method of the APT includes hiding the APT. The APT chronically invades a user terminal for a particular target in a planned way by using a series of behavior operations.

In an example, the IOC generator 240 includes a first loader 241, multiple IOC generators, and an IOC summarization module 243. The multiple IOC generators include multiple types of IOC generators, for example, include a file generator, a registry generator, a domain name generator (DNS generator), an Address Resolution Protocol generator (ARP generator), a network connection generator (Network generator), a process generator, and a user generator. A type of the IOC generator that is selected to respond to an APT is related to a type of behavior in the stable behavior feature of the APT. For example, if a behavior feature in a dynamic behavior result that includes an APT is creating a file, the type of the IOC generator that will be selected to respond to the APT includes the file generator.

The first loader (loader) 241 in the IOC generator 240 loads a corresponding program of the dynamic behavior result to memory, and allocates behavior operations in the dynamic behavior result to different generators. The dynamic behavior result includes a series of behavior operations. Each behavior operation includes a time-based behavior sequence.

In an example, the first loader 241 analyzes the behavior operations in the dynamic behavior result one by one according to a chronological order, to obtain corresponding behavior features, and sends a corresponding behavior operation in the dynamic behavior result to a corresponding generator according to a determined behavior feature. For example, the first loader 241 checks a behavior operation, and obtains that a behavior feature of the behavior operation is FCreate, that is, creating a file; then the first loader 241 sends the behavior operation to the file generator.

In an example, the first loader 241 includes a comparison table. The comparison table shows a correspondence between each behavior feature and each generator of multiple types of generators. The first loader 241 obtains a behavior feature from each behavior operation in the received dynamic behavior result, determines, by searching the comparison table, a generator corresponding to each behavior operation, and allocates the behavior operation to the corresponding generator.

For example, if the first loader 241 checks that a behavior feature of a behavior operation in the received dynamic behavior result (that is, it is already determined that the dynamic behavior result includes an APT) includes creating a file, the first loader 241 determines, by searching the comparison table, that a generator corresponding to the behavior operation is a file generator, and the first loader 241 allocates the behavior operation to the file generator.

Each IOC generator in the IOC generator 240 parses a corresponding behavior operation in the dynamic behavior result from the first loader 241, to obtain the stable behavior feature in the dynamic behavior result, that is, to extract a trail left by the APT, and generates a corresponding IOC according to the stable behavior feature. The stable behavior feature is a behavior always existing in a behavior sequence that is generated each time after the file including the APT is run.

In an example, that the IOC generator 240 obtains a stable behavior feature in the dynamic behavior result includes: running the file in the apparatus 200 at least twice, to separately obtain a behavior sequence that is generated each time after running, so as to obtain at least two behavior sequences; determining identical behaviors that exist in the at least two behavior sequences, where the identical behaviors are behaviors that are the same in terms of behavior types and behavior content; and obtaining a set formed by the identical behaviors in the at least two behavior sequences, and using the set as the stable behavior feature.

Obviously, in a process of obtaining the stable behavior feature, a larger quantity of times of running the file indicates higher accuracy of the finally obtained stable behavior feature, and higher accuracy of identifying, according to the IOC generated according to the stable behavior feature, whether the terminal device is infected with the APT.

An indicator of compromise (IOC) describes a trail left by a captured APT, and the trail is described in an xml document form. Content includes an attribute of a virus file, a changed feature of a registry, virtual memory, and the like. For example, a trail that is described by an IOC and that is left by an APT is: searching a path C:\WINDOWS\apocalyps32.exe for a file, and a length of the file is 108544 bytes. The IOC summarization module 243 summarizes multiple IOCs from multiple IOC generators (for example, a file generator and a registry generator) into one IOC, and sends the summarized IOC to the terminal device. The summarized IOC is represented by using an Extensible Markup Language (XML) document.

Figure 4:
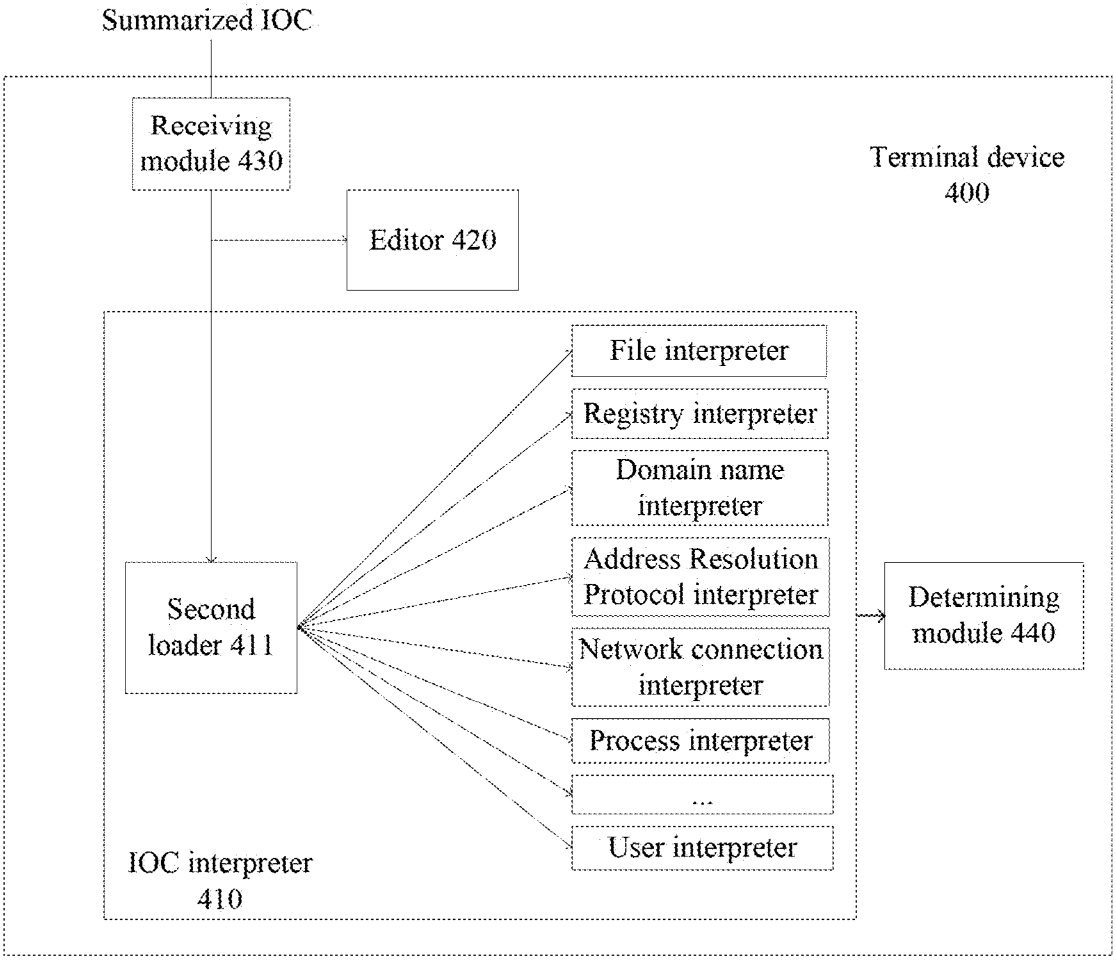
FIG. 4 is a schematic diagram of a terminal device according to an embodiment of this application.

FIG. 4 is a schematic diagram of a terminal device according to an embodiment of this application. The terminal device 400 includes an IOC interpreter 410, a receiving module 430, and a determining module 440.

The receiving module 430 is configured to receive an IOC from a security protection device.

The IOC interpreter 410 is configured to parse the IOC received by the receiving module 430, to obtain a behavior feature that corresponds to an APT and that is included in the IOC.

The determining module 440 is configured to search an operating system and a file system of the terminal device 400, to determine whether a behavior described by the behavior feature corresponding to the APT has occurred in the terminal device 400. If the behavior described by the behavior feature corresponding to the APT has occurred in the terminal device 400, the determining module 440 is configured to determine that the terminal device 400 has been infected with the APT.

Figure 5:
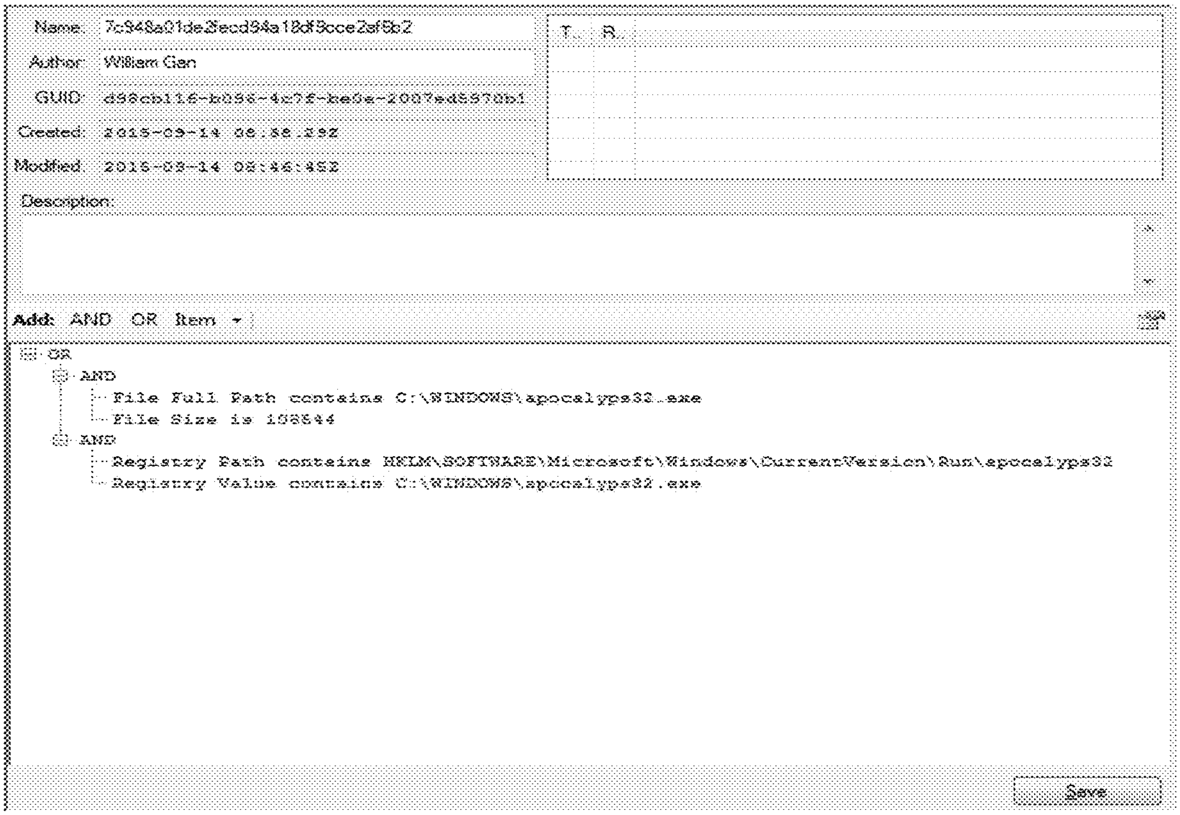
FIG. 5 is a graphical schematic diagram of a summarized IOC output by an editor according to an embodiment of this application.

In an example, the terminal device 400 further includes an editor 420. The editor 420 is configured to describe and display a received IOC, such as a summarized IOC, in a graphical form, referring to FIG. 5. FIG. 5 a schematic diagram of a graphical representation form of a summarized IOC. The editor 420 is an optional module.

In an example, the IOC interpreter 410 is in a terminal security management (TSM) software module of the terminal device 400.

A person skilled in the art may understand that the structure of the terminal device shown in FIG. 4 does not constitute any limitation to the terminal device, and may include more or less components than those shown in the figure, or some components may be combined, or a different component layout may be used.

In an example, the IOC interpreter 410 includes a second loader 411 and multiple types of interpreters.

In FIG. 4, the second loader 411 in the IOC interpreter 410 receives an IOC from the receiving module 430. For example the second loader 411 receives a summarized IOC from the receiving module 430. The second loader 411 loads a corresponding program of the summarized IOC to memory, and allocates IOCs in the summarized IOC to different interpreters.

In an example, the second loader 411 analyzes the IOCs in the summarized IOC one by one, to obtain types of the IOCs, and allocates the IOCs in the summarized IOC according to the determined types of the IOCs. For example, in an IOC, if a type of a context document included in the IOC is FileItem, it indicates that the IOC is a file-type IOC.

In an example, the second loader 411 includes a comparison table. The comparison table shows a correspondence between each IOC type and each interpreter of multiple types of interpreters. The second loader 411 obtains the IOC type from the IOC received by the second loader 411, determines, by searching the comparison table, an interpreter corresponding to each IOC, and allocates each IOC in the summarized IOC to a corresponding interpreter.

It should be noted that the IOC interpreter 410 may alternatively include an allocator (not shown in FIG. 4). In this case, the allocator allocates each IOC in the summarized IOC to a corresponding interpreter, and the second loader 411 is configured only to load the corresponding program of the summarized IOC to the memory.

The IOC interpreter 410 includes some or all of the following multiple types of interpreters: a file interpreter, a registry interpreter, a domain name interpreter (DNS interpreter), an Address Resolution Protocol interpreter (ARP interpreter), a network connection interpreter (Network interpreter), a process interpreter, and a user interpreter. A type of the interpreter is related to an IOC type.

Each interpreter in the IOC interpreter 410 receives a corresponding IOC from the second loader 411, and parses the IOC, to obtain a behavior feature included in the IOC that corresponds to the APT, to obtain a trail left by the APT. The determining module 440 searches the operating system and the file system of the terminal device 400 according to the behavior feature, to determine whether a behavior described by the behavior feature corresponding to the APT has occurred in the terminal device 400. If the behavior described by the behavior feature corresponding to the APT has occurred in the terminal device 400, the determining module 440 determines that the terminal device 400 has been infected with the APT. For example, the file interpreter obtains, by parsing, a first feature that corresponds to an APT and that is in an IOC, where the first feature is: a path C:\WINDOWS\apocalyps32.exe. The file interpreter also obtains a second feature that corresponds to the APT and that is in the IOC, where the second feature is: a file whose length is 108544 bytes. The determining module 440 searches the operating system and the file system of the terminal device 440, and queries a path C:\WINDOWS\apocalyps32.exe, to determine whether there is a file whose length is 108544 bytes, so as to determine whether the terminal device 400 is infected with the APT.

Figure 6:
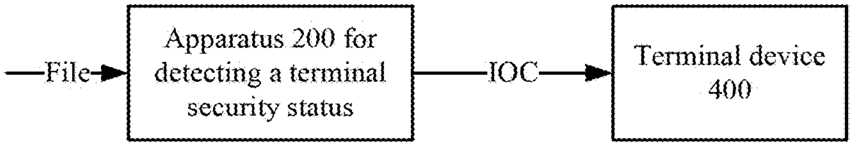
FIG. 6 is a schematic diagram of a system for detecting a terminal security status according to an embodiment of this application.

FIG. 6 shows a system for detecting a terminal security status according to an embodiment of this application. The system includes the apparatus 200 for detecting a terminal security status and the terminal device 400, the apparatus 200 for detecting a terminal security status is located at a junction between a private network and a public network, and the terminal device 400 is located in the private network.

The apparatus 200 for detecting a terminal security status receives a file from the public network, and runs the file, to generate a dynamic behavior result. The apparatus 200 determines, according to the dynamic behavior result, whether the file includes an APT. If the dynamic behavior result includes the APT, the apparatus 200 obtains a stable behavior feature in the dynamic behavior result, and generates a corresponding IOC according to the stable behavior feature. The dynamic behavior result includes a behavior sequence that is generated according to a chronological order of occurrence of behaviors. Behaviors in the behavior sequence belong to different behavior types, and the behavior types include creating a file, modifying a registry, configuring a domain name, resolving an address, connecting to a network, loading a process, and adding a user. The stable behavior feature is a behavior that always exists in a behavior sequence that is generated each time after the file is run.

The terminal device 400 receives an IOC from the apparatus 200 for detecting a terminal security status, and parses the IOC, to obtain a behavior feature that corresponds to an APT and that is included in the IOC. The terminal device 400 searches an operating system and a file system of the terminal device 400 according to the behavior feature, to determine whether behavior described by the behavior feature corresponding to the APT has occurred in the terminal device 400. If the behavior described by the behavior feature corresponding to the APT has occurred in the terminal device 400, the terminal device 400 determines that the terminal device 400 has been infected with the APT.

It should be noted that, for modules included in the apparatus 200 for detecting a terminal security status and the terminal device 400 and functions of the modules, refer to FIG. 2, FIG. 4, and related descriptions. Details are not described herein again.

Figure 7:
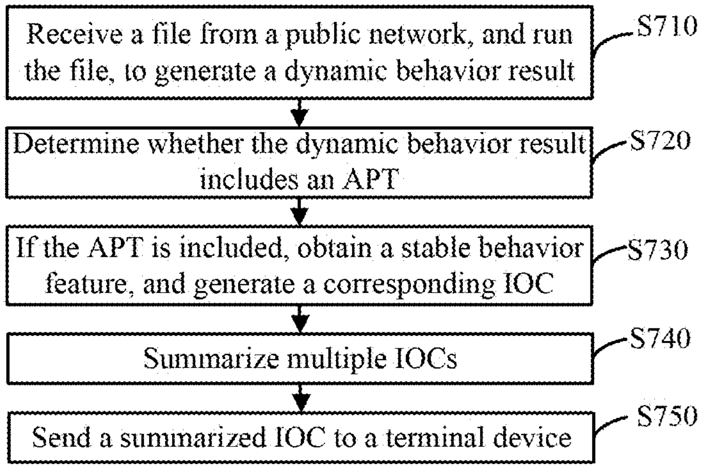
FIG. 7 is a flowchart of a method for detecting a terminal security status according to an embodiment of this application.

FIG. 7 is a flowchart of a method for detecting a terminal security status according to an embodiment of this application. The method for detecting a terminal security status is executed by a security protection device. The security protection device is located at a junction between a private network and a public network, and a terminal is located in the private network.

In an example, the method for detecting a terminal security status is performed by a sandbox, and the sandbox is arranged at a gateway.

In step 710, the security protection device receives a file from the public network, and runs the file in the security protection device, to generate a dynamic behavior result, referring to FIG. 3. The dynamic behavior result includes a behavior sequence that is generated according to a chronological order of occurrence of behaviors. Behaviors in the behavior sequence belong to different behavior types, and the behavior types include creating a file, modifying a registry, configuring a domain name, resolving an address, connecting to a network, loading a process, and adding a user.

In an example, the dynamic behavior result includes a series of behavior operations. Each behavior operation includes a time-based behavior feature.

In an example, a file from the Internet is, for example, an exe file, a DLL file, a sys file, a com file, a doc file, an xls file, or a PDF file.

In step 720, the security protection device determines, according to the generated dynamic behavior result, whether the file includes an APT.

In an example, the dynamic behavior result is matched with each dynamic behavior feature in a dynamic behavior feature library, to determine whether the dynamic behavior result includes the APT.

In step 730, if the dynamic behavior result includes the APT, the security protection device analyzes behavior operations in the dynamic behavior result one by one, to obtain a stable behavior feature in each behavior operation, that is, to extract a trail left by the APT, and generates a corresponding IOC according to the stable behavior feature. The stable behavior feature is a behavior always existing in a behavior sequence that is generated each time after the file is run.

In an example, the obtaining a stable behavior feature in the dynamic behavior result includes: running the file in the security protection device at least twice, to separately obtain a behavior sequence that is generated after each time of running, so as to obtain at least two behavior sequences; determining identical behaviors that exist in the at least two behavior sequences, where the identical behaviors are behaviors that are the same in terms of behavior types and behavior content; and obtaining a set formed by the identical behaviors in the at least two behavior sequences, and using the set as a stable behavior feature.

In step 740, the security protection device summarizes multiple IOCs generated according to the dynamic behavior result into one IOC. The summarized IOC is represented by using an Extensible Markup Language (XML) document.

Step 740 is an optional step. When an IOC is obtained according to the dynamic behavior result, the IOC does not need to be summarized, that is, step 740 does not need to be performed.

In step 750, the security protection device sends the summarized IOC to the terminal device.

Figure 8:
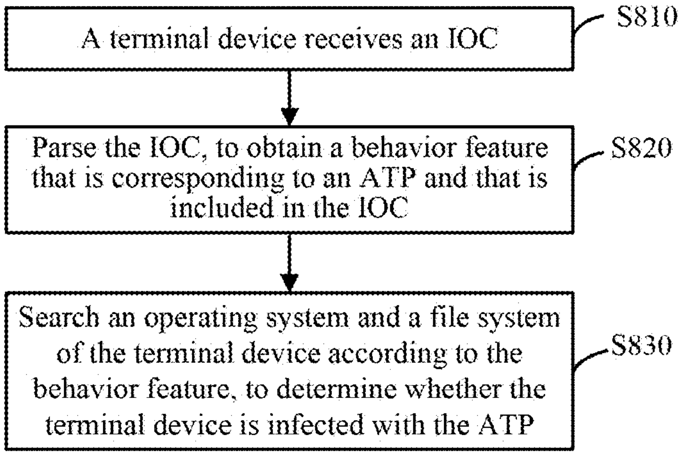
FIG. 8 is a flowchart of a method for detecting a terminal security status according to another embodiment of this application.

FIG. 8 is a flowchart of a method for detecting a terminal security status according to another embodiment of this application.

In step 810, the terminal device receives an IOC, such as a summarized IOC, from a security protection device, where the summarized IOC includes multiple IOCs.

In step 820, the terminal device parses the IOC, to obtain a behavior feature that corresponds to an APT and that is included in the IOC.

In an example, the IOC is a summarized IOC. IOCs in the summarized IOC are parsed one by one, to obtain a behavior feature that is corresponding to an APT and that is included in each IOC.

In step 830, the terminal device searches an operating system and a file system of the terminal device according to the obtained behavior feature, to determine whether a behavior described by the behavior feature corresponding to the APT has occurred in the terminal device; and if the behavior described by the behavior feature corresponding to the APT has occurred in the terminal device, determines that the terminal device has been infected with the APT.

For example, a first feature that corresponds to an APT and that is in an IOC is: a path C:\WINDOWS\apocalyps32.exe. A second feature that corresponds to the APT is: a file whose length is 108544 bytes. Therefore, the user terminal searches the path C:\WINDOWS\apocalyps32.exe in the operating system and the file system of the user terminal, and checks whether there is a file whose length is 108544 bytes in the path. If there is a file whose length is 108544 bytes in the path, it is determined that the terminal has been infected with the APT.

In an example, when the terminal device finds that an IOC in the summarized IOC includes the APT, it is determined that the terminal device is infected with the APT.

A dynamic behavior result infected with a typical APT in FIG. 3 is used as an example to describe in detail how an IOC generator converts the dynamic behavior result infected with the APT into an IOC, and how the terminal device determines, according to the received IOC, whether the terminal device is infected with the APT.

(1) A first loader 241 in an IOC generator 240 analyzes behavior operations in a received dynamic behavior result one by one, and first checks a first behavior operation in the dynamic behavior result, that is, checks a behavior operation "A sample releases a PE file" in FIG. 3. The first loader 241 learns, according to a field "action" in the first behavior operation, that the behavior feature is FCreate, that is, creating a file. The first loader 241 allocates the first behavior operation, that is, the behavior operation "A sample releases a PE file" to a file generator.

The file generator analyzes the first behavior operation, and learns that the behavior operation is FCreate, that is, creating a file, in a path C:\windows\apocalyps32.exe; and FWritePE, that is, writing an executable file. A length is 43008 bytes, that is, the length of the file is 43008 bytes; an offset is 65536 bytes, and therefore a total length of the file is 43008+65536=108544. Therefore, the file generator analyzes the behavior operation, to obtain that a corresponding behavior feature is creating an executable file apocalyps32.exe in a C:\windows\ directory, and a length of the executable file is 108544 bytes. This type of behavior feature is stable, and does not vary with different terminals. A trail having the behavior feature is left provided that the terminal device is infected with a corresponding APT. The stable behavior feature is a behavior that always exists in a behavior sequence that is generated each time after the file including the APT is run. The file generator generates a file-type IOC according to the stable behavior feature. For the file-type IOC, refer to FIG. 9. Therefore, the first behavior operation in the dynamic behavior result is converted into an IOC.

FIG. 9 is a schematic diagram of a file-type IOC. In FIG. 9, the file-type IOC represents that a trail left by an APT is a file whose length is 108544 bytes in the path C:\windows\apocalyps32.exe.

(2) The first loader 241 checks a second behavior operation in the dynamic behavior result. For example, the first loader 241 checks a behavior operation "Run the sample". The first loader 241 learns, according to the field "action", that the behavior operation is CreateProcess, that is, creating a process, in a path C:\windows\apocalyps32.exe: 1252. The first loader 241 allocates the behavior operation to a process generator.

The process generator analyzes the second behavior operation, to learn that the behavior operation is CreateProcess, that is, loading a process, in the path C:\windows\apocalyps32.exe: 1252, where a value of a pid is 1448; and then FOpen, that is, opening a file, where a value of a process identifier (pid) is 1488. The pid is an unstable feature, and a value of the pid varies with different terminal devices. Therefore, the behavior operation "Run the sample" is an unstable behavior operation, and no IOC is generated.

(3) The first loader 241 checks a third behavior operation in the dynamic behavior result. For example, the first loader 241 checks a behavior operation "Create a thread, and inject the thread into a process IEXPLORE.EXE to hide the thread". The first loader 241 learns, according to the field "action", that the behavior operation is OpenProcess explorer.exe, that is, opening a browser. The first loader 241 allocates the behavior operation to a process generator.

The process generator analyzes the third behavior operation, to learn that the behavior operation is first OpenProcess explorer.exe, that is, opening a browser, where a value of a process identifier (pid) is 1244; and then, WriteOtherProcMem, that is, writing an IE thread, where a value of a pid is 1488. The pid is an unstable feature, and a value of the pid varies with different terminal devices. Therefore, the behavior operation is an unstable behavior operation, and no IOC is generated.

(4) The first loader 241 checks a fourth behavior operation in the dynamic behavior result, that is, checks a behavior operation "Modify a registry to add an automatic startup item". The first loader 241 learns, according to the field "action", that the behavior operation is RegCreateKey, that is, creating a registry item, in a path HKLM\SOFTWARE\Microsoft\Windows\CurrentVersion\Run. The first loader 241 sends the behavior operation to a registry generator.

The registry generator analyzes the fourth behavior operation, to learn that the behavior operation is RegCreateKey, that is, creating a registry item, in HKLM\SOFTWARE\Microsoft\Windows\CurrentVersion\Run. A key value of the registry item is set to C:\WINDOWS\apocalyps32.exe. Therefore, the registry generator analyzes the behavior operation, to obtain that a corresponding behavior feature is adding an automatic startup item C:\WINDOWS\apocalyps32.exe in a path HKLM\SOFTWARE\Microsoft\Windows\CurrentVersion\Run\apocalyps32.

This type of behavior feature is stable, and does not vary with different terminal devices. A trail of the behavior feature is left provided that the terminal device is infected with a corresponding APT. The stable behavior feature is a behavior that always exist in a behavior sequence that is generated each time after a file including the APT is run. The registry generator converts the behavior operation into a registry-type IOC, referring to FIG. 10.

FIG. 10 is a schematic diagram of a registry-type IOC. In FIG. 10, a trail left by an APT is: searching a registry path HKLM\SOFTWARE\Microsoft\Windows\CurrentVersion\Run\apocalyps32 to determine whether the path exists. If the path exists, a value corresponding to the path is C:\windows\apocalyps32.exe.

(5) The first loader 241 checks a fifth behavior operation in the dynamic behavior result, that is, checks a behavior operation "Connect to an external network". The first loader 241 learns, according to the field "action", that the behavior operation is connect, that is, connecting to an external network. The first loader 241 allocates the behavior operation to a network connection generator.

The network connection generator analyzes the fifth behavior operation, to learn that the behavior operation is connecting to the external network, and an IP address is 5.5.66.101:1453.1453 in the IP address is an unstable feature, and values thereof vary with different terminal devices. Therefore, the behavior operation "Connect to an external network" is an unstable behavior operation, and no IOC is generated.

It may be learned, according to the foregoing analysis, that an APT execution process in FIG. 3 is: first releasing an executable file; subsequently, running the executable file; then, hiding the APT execution process in an IE browser, so that the APT execution process cannot be found in the task manager; adding an automatic startup registry item, so that the APT exists in a system each time after the system is restarted; and finally, stealing information or damaging the system by connecting to an external network.

(6) The IOC summarization module 243 receives the file-type IOC (as shown in FIG. 9) from the file generator, receives the registry-type IOC (as shown in FIG. 10) from the registry generator, summarizes the file-type IOC and the registry-type IOC, to obtain a summarized IOC, and displays the summarized IOC in an XML document form, referring to FIG. 11.

FIG. 11 is a schematic diagram of a summarized IOC. The summarized IOC is represented in an XML file form. The XML file includes information such as a brief description about the IOC, an author, and a creation date, and includes a description about the trail of the APT: an executable file whose length is 108544 bytes in the path C:\windows\apocalyps32.exe; or adding an automatic startup item C:\WINDOWS\apocalyps32.exe in the path HKLM\SOFTWARE\Microsoft\Windows\CurrentVersion\Run\apocalyps32.

(7) A receiving module 430 in the terminal device receives the summarized IOC (including the file-type IOC and the registry-type IOC) from the apparatus 200 for detecting a terminal security status (that is, the security protection device), where for a specific summarized IOC, refer to FIG. 11, and sends the summarized IOC to a second loader 411.

(8) The second loader 411 analyzes the IOCs in the summarized IOC one by one, and first checks a first IOC, that is, the file-type IOC, in the summarized IOC. The second loader 411 learns, according to a field "Context document", that a behavior feature is FileItem, that is, a file item. The second loader 411 allocates the first IOC, that is, the file-type IOC, to a file interpreter.

(9) The file interpreter parses the file-type IOC, to obtain two behavior features of the APT that are included in the IOC: One behavior feature is determining whether C:\WINDOWS\apocalyps32.exe exists; and the other behavior feature is determining whether a length of the file is 108544 bytes. The two behavior features are in an "and (English: and)" relationship, referring to FIG. 9.

(10) A determining module 440 searches an operating system and a file system of a terminal device 400, to determine whether a behavior described by a behavior feature corresponding to the APT has occurred in the terminal device 400. If the behavior described by the behavior feature corresponding to the APT has occurred in the terminal device 400, the determining module 440 determines that the terminal device 400 has been infected with the APT. That is, if a file whose length is 108544 bytes is found in the path C:\WINDOWS\apocalyps32.exe, the determining module 440 determines that the terminal device 400 has been infected with the APT.

(11) The second loader 411 checks a second IOC, that is, the registry-type IOC, in the summarized IOC. The second loader 411 learns, according to the field "Context document", that the feature is Registryltem, that is, a registry item. The second loader 411 allocates the second IOC, that is, the registry-item IOC, to a registry interpreter.

The registry interpreter parses the registry-item IOC, to obtain two behavior features of the APT that are included in the IOC: One behavior feature is determining whether a registry path "HKLM\SOFTWARE\Microsoft\Windows\CurrentVersion\Run\apocalyps32" exists; and the other behavior feature is determining whether registry-item content is "C:\WINDOWS\apocalyps32.exe". The two behavior features are in an "and (English: and)" relationship, referring to FIG. 10.

(12) The determining module 440 searches the operating system and the file system of the terminal device 400, to determine whether the behavior described by the behavior feature corresponding to the APT has occurred in the terminal device 400. If the behavior described by the behavior feature corresponding to the APT has occurred in the terminal device 400, the determining module determines that the terminal device 400 has been infected with the APT. That is, the determining module 440 searches in the path HKLM\SOFTWARE\Microsoft\Windows\CurrentVersion\Run\apocalyps32 to determine whether content C:\WINDOWS\apocalyps32.exe is included. If the content is included, it indicates that the terminal device 400 is infected with the APT.

Steps of the method or algorithm that are described in the content disclosed in this application may be implemented in a hardware manner, or may be implemented in a manner of a software instruction executed by a processor. The software instruction may include a corresponding software module. The software module may be located in a random access memory (RAM) memory, a flash memory, a read only memory (ROM) memory, an erasable programmable read only memory (EPROM) memory, an electrically erasable programmable read only memory (EEPROM) memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A device, comprising:

at least one processor; and a non-transitory computer-readable storage medium storing a program to be executed by the at least one processor, the program including instructions for:

receiving a file;

running the file in the device to generate a first sequence of behaviors, wherein running the file in the device causes the first sequence of behaviors to occur, and wherein behaviors in the first sequence of behaviors comprise a first behavior and a second behavior, the first behavior has a different behavior type from the second behavior, and the first behavior and the second behavior respectively have a behavior type of the following behavior types: creating another file, modifying a registry, configuring a domain name, resolving an address, connecting to a network, loading a process, or adding a user;

determining, according to the generated first sequence of behaviors, whether the file comprises an advanced persistent threat; and in response to determining that the file comprises the advanced persistent threat, running the file in the device at least one additional time to generate a plurality of sequence of behaviors, wherein each running of the file in the device causes a respective sequence of behaviors to occur, and the plurality of sequence of behaviors comprises the first sequence of behaviors;

determining identical behaviors that exist in each sequence of behaviors comprised in the plurality of sequence of behaviors, wherein the identical behaviors have a same behavior types and a same behavior content in each sequence of behaviors; and identifying a set of behaviors, the set of behaviors comprising the determined identical behaviors, and determining the set of behaviors to be a stable behavior feature, wherein the stable behavior feature is a behavior that occurs each time the file is run;

generating a first indicator of compromise corresponding to the stable behavior feature; and sending the first indicator of compromise to a terminal, wherein the terminal is located in a protected network.

2. The device according to claim 1, wherein the non-transitory computer-readable storage medium further stores a dynamic behavior feature library, wherein the dynamic behavior feature library comprises multiple false positive behavior features and multiple threat behavior features; and wherein the program further includes instructions for:

comparing the first sequence of behaviors with the multiple false positive behavior features and the multiple threat behavior features in the dynamic behavior feature library; and determining whether the file comprises the advanced persistent threat according to a result of the comparisons.

3. The device according to claim 1, wherein generating the first indicator of compromise corresponding to the stable behavior feature comprises:

generating a plurality of second indicators of compromise corresponding to a plurality of behaviors in the stable behavior feature; and creating the first indicator of compromise by summarizing each of the plurality of second indicators of compromise.

4. The device according to claim 1, wherein the device is comprised in a gateway, the gateway further comprises a firewall, and the device receives the file from the firewall.

5. The device according to claim 1, wherein the program further comprises instructions for:

in response to determining the file does not comprise the advanced persistent threat, sending the file to the terminal.

6. The device according to claim 1, wherein the first indicator of compromise describes an indicator of the advanced persistent threat.

7. The device according to claim 1, wherein the first indicator of compromise describes an attribute of the file.

8. The device according to claim 1, wherein the first indicator of compromise describes a change to a registry.

9. A method, comprising:

receiving a file by a device;

running the file in the device to generate a first sequence of behaviors, wherein running the file in the device causes the first sequence of behaviors to occur, and wherein behaviors in the first sequence of behaviors comprise a first behavior and a second behavior, the first behavior has a different behavior type from the second behavior, and the first behavior and the second behavior respectively have a behavior type of the following behavior types: creating another file, modifying a registry, configuring a domain name, resolving an address, connecting to a network, loading a process, or adding a user;

determining, according to the generated first sequence of behaviors, whether the file comprises an advanced persistent threat; and in response to determining that the file comprises the advanced persistent threat, running the file in the device at least one additional time to generate a plurality of sequence of behaviors, wherein each running of the file in the device causes a respective sequence of behaviors to occur, and the plurality of sequence of behaviors comprises the first sequence of behaviors;

determining identical behaviors that exist in each sequence of behaviors comprised in the plurality of sequence of behaviors, wherein the identical behaviors have a same behavior types and a same behavior content in each sequence of behaviors; and identifying a set of behaviors, the set of behaviors comprising the determined identical behaviors, and determining the set of behaviors to be a stable behavior feature, wherein the stable behavior feature is a behavior that occurs each time the file is run;

generating a first indicator of compromise corresponding to the stable behavior feature; and sending the first indicator of compromise to a terminal, wherein the terminal is located in a protected network.

10. The method according to claim 9, further comprising:

comparing the first sequence of behaviors with multiple false positive behavior features and multiple threat behavior features comprised in a dynamic behavior feature library; and determining whether the file comprises the advanced persistent threat according to a result of the comparisons.

11. The method according to claim 9, wherein generating the first indicator of compromise corresponding to the stable behavior feature comprises:

generating a plurality of second indicators of compromise corresponding to a plurality of behaviors in the stable behavior feature; and creating the first indicator of compromise by summarizing each of the plurality of second indicators of compromise.

12. The method according to claim 9, wherein the device is comprised in a gateway, the gateway further comprises a firewall, and the device receives the file from the firewall.

13. The method according to claim 9, further comprising:

in response to determining the file does not comprise the advanced persistent threat, sending the file to the terminal.

14. A system, comprising:

a terminal device, located in a protected network; and a security protection device, configured to:

receive a file;

run the file in the security protection device to generate a first sequence of behaviors, wherein running the file in the security protection device causes the first sequence of behaviors to occur, and wherein behaviors in the first sequence of behaviors comprise a first behavior and a second behavior, the first behavior has a different behavior type from the second behavior, and the first behavior and the second behavior respectively have a behavior type of the following behavior types: creating another file, modifying a registry, configuring a domain name, resolving an address, connecting to a network, loading a process, or adding a user;

determine, according to the generated first sequence of behaviors, whether the file comprises an advanced persistent threat; and in response to determining that the file comprises the advanced persistent threat, run the file in the security protection device at least one additional time to generate a plurality of sequence of behaviors, wherein each running of the file in the security protection device causes a respective sequence of behaviors to occur, and the first sequence of behaviors is comprised in the plurality of sequence of behaviors;

determine identical behaviors that exist in each sequence of behaviors comprised in the plurality of sequence of behaviors, wherein the identical behaviors have a same behavior types and a same behavior content in each sequence of behaviors; and identify a set of behaviors, the set of behaviors comprising the determined identical behaviors, and determining the set of behaviors to be a stable behavior feature, wherein the stable behavior feature is a behavior that occurs each time the file is run;

generate a first indicator of compromise corresponding to the stable behavior feature; and send the first indicator of compromise to the terminal device; and wherein the terminal device is configured to:

receive the first indicator of compromise from the security protection device;

parse the received first indicator of compromise to obtain the stable behavior feature; and search an operating system and a file system of the terminal device to determine whether a behavior described by the stable behavior feature has occurred in the terminal device; and in response to determining that the behavior described by the stable behavior feature has occurred in the terminal device, determine that the terminal device has been infected with the advanced persistent threat.

15. The system according to claim 14, wherein the security protection device being configured to generate the first indicator of compromise corresponding to the stable behavior feature comprises the security protection device being configured to:

generate a plurality of second indicators of compromise corresponding to a plurality of behaviors in the stable behavior feature; and create the first indicator of compromise by summarizing each of the plurality of second indicators of compromise.

16. The system according to claim 14, wherein the security protection device is comprised in a gateway, the gateway further comprises a firewall, and the security protection device receives the file from the firewall.

17. The system according to claim 14, wherein the security protection device is further configured to:

when the file does not comprise the advanced persistent threat, send the file to the terminal device.

18. The system according to claim 14, wherein the first indicator of compromise describes an indicator of the advanced persistent threat.

* * * * *